(12) United States Patent
Ferreira Gomes et al.

(10) Patent No.: US 11,038,209 B2
(45) Date of Patent: Jun. 15, 2021

(54) THIN-FILM BATTERY

(71) Applicant: STMICROELECTRONICS (TOURS) SAS, Tours (FR)

(72) Inventors: Franck Ferreira Gomes, Joué-lès-Tours (FR); Delphine Guy-Bouyssou, Luynes (FR)

(73) Assignee: STMICROELECTRONICS (TOURS) SAS, Tours (FR)

( * ) Notice: Subject to any disclaimer, the term of this patent is extended or adjusted under 35 U.S.C. 154(b) by 115 days.

(21) Appl. No.: 16/268,210

(22) Filed: Feb. 5, 2019

(65) Prior Publication Data

US 2019/0245248 A1 Aug. 8, 2019

(30) Foreign Application Priority Data

Feb. 5, 2018 (FR) ...................... 1850929

(51) Int. Cl.
| | |
|---|---|
| *H01M 10/00* | (2006.01) |
| *H01M 10/0585* | (2010.01) |
| *H01M 10/0562* | (2010.01) |
| *H01M 4/525* | (2010.01) |
| *H01M 4/38* | (2006.01) |
| *H01M 4/46* | (2006.01) |
| *H01M 4/66* | (2006.01) |
| *H01M 10/44* | (2006.01) |
| *H01M 10/04* | (2006.01) |
| *H01M 50/116* | (2021.01) |
| *H01M 6/40* | (2006.01) |

(52) U.S. Cl.
CPC ......... *H01M 10/0585* (2013.01); *H01M 4/38* (2013.01); *H01M 4/386* (2013.01); *H01M 4/387* (2013.01); *H01M 4/463* (2013.01); *H01M 4/525* (2013.01); *H01M 4/661* (2013.01); *H01M 10/0436* (2013.01); *H01M 10/0562* (2013.01); *H01M 10/446* (2013.01); *H01M 50/116* (2021.01); *H01M 6/40* (2013.01); *H01M 2300/0068* (2013.01)

(58) Field of Classification Search
CPC ........... H01M 2300/0068; H01M 6/40; H01M 10/0562; H01M 10/0436; H01M 4/38
See application file for complete search history.

(56) References Cited

U.S. PATENT DOCUMENTS

| | | |
|---|---|---|
| 2004/0023106 A1 | 2/2004 | Benson et al. |
| 2015/0325878 A1 | 11/2015 | Larfaillou et al. |
| 2018/0277885 A1* | 9/2018 | Takami ................ H01M 4/485 |

(Continued)

OTHER PUBLICATIONS

Bach et al., "Lithiation and Delithiation Mechanisms of Gold Thin Film Model Anodes for Lithium Ion Batteries: Electrochemical Characterization," *Electrochimica Acta* 164:81-89, 2015.

(Continued)

*Primary Examiner* — Cynthia H Kelly
*Assistant Examiner* — Monique M Wills
(74) *Attorney, Agent, or Firm* — Seed IP Law Group LLP

(57) ABSTRACT

The disclosure concerns a lithium battery comprising, in order, a support, a copper electrode and, in contact with the copper electrode, a layer of a material capable of forming an alloy with lithium. The disclosure further concerns a manufacturing method and a method of putting into service such a battery.

20 Claims, 1 Drawing Sheet

(56) References Cited

U.S. PATENT DOCUMENTS

2019/0165342 A1* 5/2019 Berland .................. H01M 2/08

OTHER PUBLICATIONS

Horopanitis et al., "Electrical properties of $LiNbO_3$ (electrolyte)/Cu (anode) bi-layers,"*Materials Science and Engineering B* 176:512-514, 2011.

Neudecker et al., ""Lithium-Free" Thin-Film Battery with In Situ Plated Li Anode," *Journal of the Electrochemical Society* 147(2):517-523, 2000.

Zhang et al., "A tin-plated copper substrate for efficient cycling of lithium metal in an anode-free rechargeable lithium battery," *Electrochimica Acta* 258:1201-1207, 2017.

\* cited by examiner

THIN-FILM BATTERY

CROSS-REFERENCE TO RELATED APPLICATION(S)

This application claims the priority benefit of French patent application number 18/50929, filed on Feb. 5, 2018, the content of which is hereby incorporated by reference in its entirety to the maximum extent allowable by law.

BACKGROUND

Technical Field

The present application relates to the field of thin-film batteries, and more particularly what are known as "lithium-free" thin-film batteries.

Description of the Related Art

The terms "thin-film battery" and "microbattery" conventionally refer to an assembly comprising a support and, on one face of the support, a stack of layers forming an active battery element. The stack includes in particular a solid electrolyte layer between a negative electrode and a positive electrode. The overall assembly is generally covered with an encapsulation layer allowing access to a positive terminal and a negative terminal of the battery. The total thickness of a thin-film battery is typically in the order of a few tens to a few hundreds of micrometers, for example between 25 and 250 μm, for an area of between a few square millimeters to a few square centimeters, for example between 25 $mm^2$ and 25 $cm^2$, thereby allowing the battery to be accommodated in very small spaces. In addition, depending on the characteristics of the support, flexible batteries can be provided, such batteries being able to conform to the electronic devices in which they will be integrated.

In a thin-film battery, electrochemical charge and discharge reactions may be based on the lithium element. In this case, the positive electrode is generally made of lithium cobalt dioxide ($LiCoO_2$) and the electrolyte layer is generally made of lithium phosphorous oxynitride (LiPON). Such a thin-film battery is said to be of lithium-metal type when its negative electrode is a layer of metallic lithium deposited during the manufacture of the battery, for example by chemical vapor deposition (CVD) or by evaporation, between the step of forming the electrolyte layer and the step of forming the encapsulation layer. Such a battery is said to be of lithium-free type when the negative electrode is a layer of copper deposited directly on and in contact with the face of the electrolyte layer opposite the face that is in contact with the positive electrode, between the step of forming the electrolyte layer and the step of forming the encapsulation layer. The term "lithium-free" really means "without deposition of metallic lithium", even though the battery does in fact contain lithium, in particular in its electrolyte and in its positive electrode.

Lithium-free batteries in the prior art suffer from a lack of performance compared to lithium-metal batteries, and in particular a loss of capacity after only a few charge and discharge cycles.

BRIEF SUMMARY

It would be desirable to have a battery that overcomes at least some of the disadvantages of usual thin-film batteries of the lithium-free type.

Thus, one embodiment provides a lithium battery comprising, in order, a support, a copper electrode and, in contact with the copper electrode, a layer of a material capable of forming an alloy with lithium.

According to an embodiment, the material is silicon, germanium, silicon-germanium, tin or aluminum.

According to an embodiment, an electrolyte layer made of LiPON is interposed between said copper electrode and a further electrode.

According to an embodiment, the further electrode is a $LiCoO_2$ layer.

According to an embodiment, a first face of the copper electrode is in contact with the layer of the material capable of forming an alloy with lithium, and a second face of the copper electrode is facing the electrolyte layer.

According to an embodiment, the copper electrode is in contact with the electrolyte layer.

According to an embodiment, the electrolyte layer comprises an accumulation of metallic lithium close to the interface between the electrolyte layer and the copper electrode.

According to an embodiment, the thickness of the layer of the material capable of forming an alloy with lithium is comprised between 10 and 50 nm.

According to an embodiment, the thickness of the copper electrode is comprised between 50 nm and 1 μm.

According to an embodiment, the battery is a thin-film battery.

According to an embodiment, the battery is of the lithium-free type.

A further embodiment provides a method for manufacturing a battery as above-mentioned, comprising the following successive steps: a) forming the copper electrode; and b) forming the layer of the material capable of forming an alloy with lithium, directly on the copper electrode.

According to an embodiment, the method comprises, before the step a), the following successive steps: c) forming said other electrode; and d) forming the electrolyte layer on which is directly formed the copper electrode of the step a).

A further embodiment provides a method of putting into service a battery as above-mentioned, the method comprising a first charging phase of the battery under a current of at most a few tens of microamperes per square centimeter, for a plurality of hours.

A further embodiment provides a method of putting into service a battery obtained according to the above-mentioned manufacturing method, the method comprising a first charging phase of the battery under a current of at most a few tens of microamperes per square centimeter, for a plurality of hours.

BRIEF DESCRIPTION OF THE SEVERAL VIEWS OF THE DRAWINGS

These features and their advantages, along with others, will be presented in detail in the following description of particular embodiments, provided without limitation and in relation to the appended figures in which.

DETAILED DESCRIPTION

The various figures have not been drawn to scale and, in addition, in the various figures, elements that are the same have been referenced by the same references. For the sake of clarity, only those elements which are useful to the comprehension of the described embodiments have been shown and are described in detail. In particular, the production of the various layers forming a battery has not been described in detail, since the embodiments described are compatible with the standard techniques for producing a lithium-free battery. In the following description, when reference is made to qualifiers of relative position, such as the terms "above", "below", "upper", "lower", etc., or to qualifiers of orientation, such as the terms "horizontal", "vertical", etc., reference is being made to the orientation of the figures, it being understood that, in practice, the batteries described may be oriented differently. Unless specified otherwise, the expressions "about", "substantially" and "in the order of" signify to within 10%, preferably to within 5%.

Furthermore, in the present description, the negative electrode refers to the first metallic layer deposited directly on the electrolyte layer, namely a layer of copper in the case of a battery of lithium-free type (as opposed to a lithium metal layer in the case of a lithium-metal battery).

Figure 1:
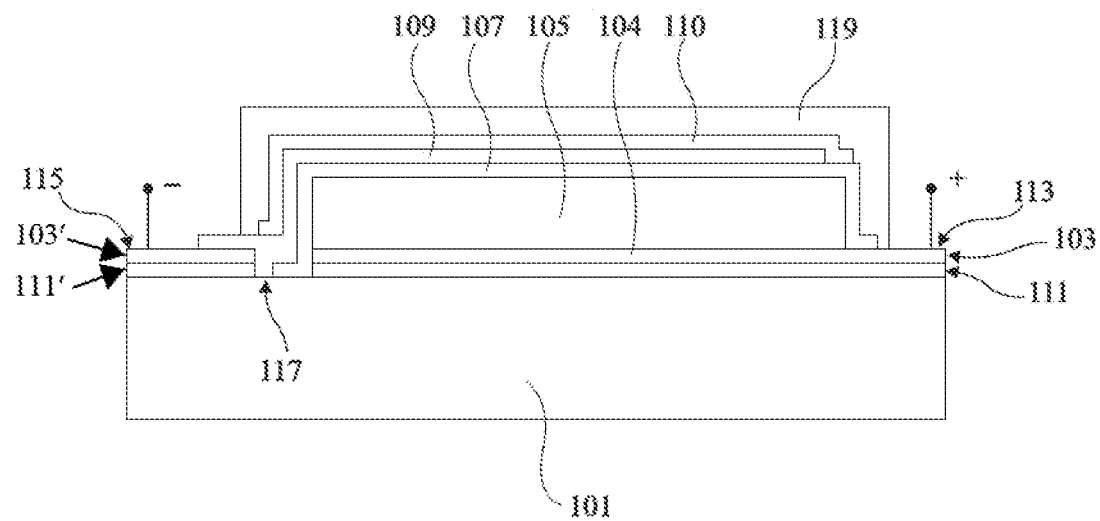
FIG. 1 is a schematic cross-sectional view illustrating an embodiment of a thin-film battery of lithium-free type.

The battery of FIG. 1 comprises a substrate or support 101, for example made of mica or of ceramic, and, on the upper face of the substrate 101, a stack forming an active element of the battery. An optional first adhesion layer 111 is, in this example, disposed between the support 101 and the active stack. The active stack comprises, in order from the upper face of the first adhesion layer 111, or in embodiments without such a first adhesion layer, from the upper face of the substrate, a first conductive layer 103, for example made of platinum or of gold, a layer 105 made of $LiCoO_2$, a layer 107 made of LiPON and a layer 109 made of copper. The first conductive layer 103 comprises a portion in the stack forming cathode current collector 104 of the battery. The layer 103 may have a thickness comprised between 50 nm and 5 μm, for example in the order of 100 nm. The layer 105 forms the positive electrode or cathode of the battery. The layer 105 is for example disposed on and in contact with the upper face of the layer 103. The layer 105 may have a thickness comprised between 2 and 50 for example in the order of 10 μm. The layer 107 forms the electrolyte of the battery. The layer 107 is for example disposed on and in contact with the upper face of the layer 105. The layer 107 may have a thickness comprised between 0.5 and 5 μm, for example in the order of 2 μm. The layer 109 forms the negative electrode of the battery. The layer 109 is disposed on and in contact with the upper face of the layer 107. The layer 109 may have a thickness comprised between 50 nm and 1 μm, for example in the order of 100 nm.

The battery further comprises a layer 110 of a material capable of forming an alloy with lithium, in contact with the surface of the layer 109 opposite the electrolyte layer 107. The layer 110 covers at least partially, preferably entirely, the face of the layer 109 opposite the electrolyte layer 107. Stated otherwise, the battery comprises, in order, the support 101, the copper electrode 109 and the layer 110. For the layer 110, the material capable of forming an alloy with lithium is for example silicon, germanium, tin, aluminum, etc., or a combination of several of these elements, noting that copper does not form an alloy with lithium. The layer 110 is preferably of silicon, germanium or silicon-germanium. The layer 110 may have a thickness comprised between 10 and 50 nm, for example equal to 25 nm.

In the example of FIG. 1, the positive electrode 105 forms a plate on a central portion of the support 101. The electrolyte layer 107 entirely covers the upper face of the positive electrode 105. The layer 107 also covers the flanks of the positive electrode 105. Thus, the positive electrode 105 is entirely encapsulated by the electrolyte layer 107 on the top and lateral sides of the electrode 105 and by the current collector 104 at the bottom of the electrode 105.

The battery additionally comprises, on the upper face of the support 101, in a peripheral portion of the support that is not covered by the layer 105, a positive (+) contact terminal 113 (to the right of the active portion of the battery in the orientation of FIG. 1) and a negative (−) contact terminal 115 (to the left of the active portion of the battery in the orientation of FIG. 1). The terminals 113 and 115 are intended to be connected to an external device. The positive terminal 113 is electrically connected to the cathode current collector 104, and the negative terminal 115 is electrically connected to the negative electrode 109. In this example, the positive terminal 113 is formed by a section of the conductive layer 103 that is contiguous with (and hence electrically connected to) the cathode current collector 104.

The negative terminal 115 is itself formed by a second conductive layer 103' that is separated from the cathode current collector 104 and from the positive terminal 113 (so as not to short the battery). The second conductive layer 103' is formed on a second adhesion layer 111' that is formed on the substrate 101. In the example shown, the first adhesion layer 111, for example of lithium cobalt oxynitride (LiCoON), forms an interface between the substrate 101 and the layer 103, the cathode current collector 104 and the positive terminal 115 resting on a first portion of the layer 111. Likewise, the second adhesion layer 111', for example of lithium cobalt oxynitride (LiCoON), forms an interface between the substrate 101 and the layer 103', the negative terminal 115 resting on a portion of the layer 111', which is disjoined from the layer 103 to avoid the risk of shorting the battery. 103', The adhesion layers 111, 111' are formed from a single adhesion layer formed directly on the entire upper face of the substrate and the conductive layers 103, 103' are formed from a single conductive layer formed directly on the entire upper face of the single adhesion layer. An opening 117 is made vertically through the single adhesion layer and the single conductive layer, to thereby form the first and second conductive layers 103, 103' and the first and second adhesion layers 111, 111'. The opening 117 opens onto the substrate 101, between the negative terminal 115 and the cathode current collector 104, electrically insulates the negative terminal 115 from the cathode current collector 104. The first and second layers 111, 111' are for example disposed on and in contact with the upper face of the substrate 101, and are respectively in contact with the first and second conductive layers 103, 103'.

The conductive layer 109 covers the upper face of the LiPON layer 107, and extends down to and contacts the negative terminal 115 of the battery, passing over a flank of the active stack (the left-hand flank in the orientation of FIG. 1), as well as over the lateral walls and over the bottom of the opening 117. In this example, the LiPON layer 107 extends at least over the flank of the opening 117, which flank is located on the current collector 104 side, down to the bottom of the opening 117. Thus, the negative electrode layer 109 is electrically insulated from the positive electrode 105 and the cathode current collector 104 by the layer 107.

In the non-illustrated case where the support 101 is made of a material that can electrically connect the conductive layer 109 to the cathode current collector 104, an insulating layer is provided at the bottom of the opening 117, between the layer 109 and the support 101.

In the example shown, the layer 110 covers a portion of the layer 109 resting on the upper face of the electrolyte layer 107, a portion of the layer 109 disposed on a sidewall of the active stack (the left sidewall in the orientation of FIG. 1) and a portion of the layer 109 disposed in the opening 117. A portion of the layer 109 disposed on the negative terminal 115 is not covered with the layer 110.

The battery of FIG. 1 additionally comprises an encapsulation layer 119 that entirely covers the upper face and the flanks of the active stack and allows access only to the positive 113 and negative 115 terminals of the battery and a portion of the layer 109 on the upper face of the substrate 101. In this example, the encapsulation layer 119 completely covers the layer 110. The encapsulation layer 119 is for example an aluminum film covered (on the side of its face opposite the substrate 101) with polyethylene terephthalate (PET), also known by the abbreviation alu-PET. The layer 119 made of alu-PET has the advantage of being highly flexible and hence particularly well-suited to thin-film batteries that are intended to conform to the electronic devices in which they are integrated. In practice, in the case of the layer 119 being made of alu-PET, an adhesion layer forms an interface between the active stack covered with the layer 110 and the layer 119 so as to fix the layer 119 in place and to insulate it from the layers 109 and 110.

By way of example, in order to produce the battery of FIG. 1, the layers 111, 111', 103, 103', 105, 107 and 109 are first formed in succession on the upper surface of the substrate 101, for example using sputtering techniques through shadow masks in order to localize the various layers, or by successive steps of deposition and etching to leave in place, at the desired locations, portions of layers with desired contours. The layer 110 is then formed or deposited directly on the negative copper electrode 109. The layer 109 is for example deposited by chemical vapor deposition. The encapsulation layer 119 is then formed on the active stack covered with the layer 110, for example by means of rolling. Several identical batteries of the type of that of FIG. 1 can be manufactured simultaneously from a same support 101. The layers 111, 111', 103, 103', 105, 107, 109 and 110 can then be formed simultaneously for all the batteries, for example by successive steps of deposition and etching, and the resulting structure is then cut to obtain a plurality of individualized batteries.

Compared to a thin-film battery of lithium-free type that does not include the layer 110, the manufacture of the battery of FIG. 1 does not require more than one additional step. Furthermore, this additional step is compatible with the standard manufacturing processes implemented in the field of microelectronics, a battery of the type of that of FIG. 1 and being capable of being manufactured using technologies of the microelectronics industry.

When a battery of the type of that of FIG. 1 is put into service, i.e., during the first charging phase of the battery, metallic lithium accumulates in the electrolyte layer 107, close to the interface between layers 107 and 109 ("Li plating"). This accumulation arises due to the migration of lithium ions from the positive electrode 105 and the electrolyte 107 towards the negative electrode 109 where they accumulate in metallic form. During discharge, the lithium ions migrate back through the electrolyte 107 towards the positive electrode 105, and the accumulation of metallic lithium disappears or decreases in thickness ("Li stripping"). Next, the accumulation of metallic lithium is reformed during each charging phase and disappears once more (at least partially) during each discharging phase of the battery.

According to an embodiment, the first charging phase is a fast charge performed by applying a constant voltage in the order of 4.2 V to the terminals of the battery, the current in the battery then reaching values in the order of a few milliamps. This first phase of fast charging usually lasts less than one hour. In this case, thicknesses of the layers 110 and 109 will be adapted with respect to the thickness of the layer 107.

According to another embodiment, the first charging phase is a slow charge under a constant current, for example followed by a fast discharge phase, itself being for example followed by a fast charge phase as described for example in US patent application 2015/0325878, in connection with its FIGS. 2 and 3A to 3D. This first phase of slow charging lasts longer (several tens of hours) than a first phase of fast charging. By way of example, the charge is said to be slow under a constant current when the current per unit of active surface flowing from the cathode current collector 104 to the negative electrode 109 is at most a few tens of microamps per square centimeter, preferably less than 33 $\mu A/cm^2$. This is a current for example at least ten times lower than the currents which the batteries of this type are subjected to during a first phase of fast charging.

The inventors have found that the presence of the layer 110 of a material capable of forming an alloy with lithium improves the capacity and the lifetime of a battery of lithium-free type.

Figure 2:
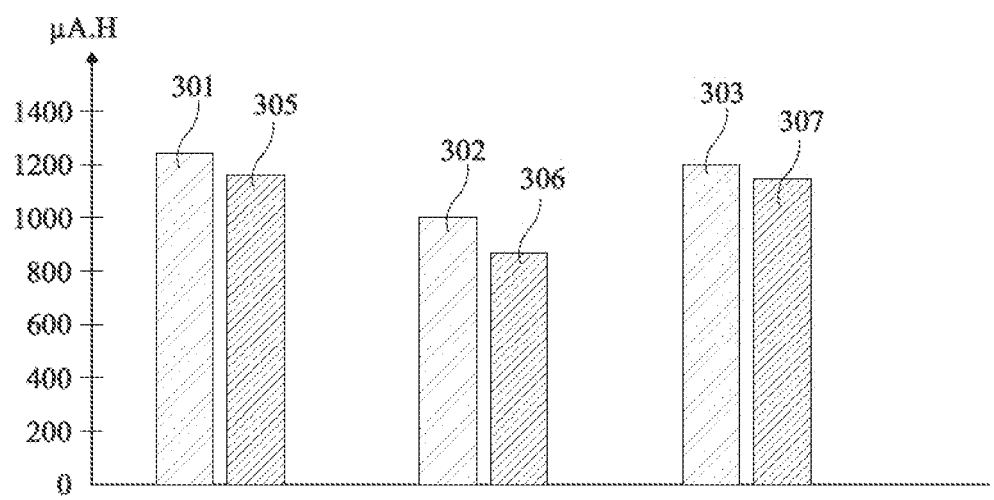
FIG. 2 is a bar graph illustrating the capacity variation of different thin-film batteries after 50 charge and discharge cycles.

FIG. 2 is a bar graph illustrating the variation in capacity, in $\mu A \cdot h$ at 60° C., after 50 charge and discharge cycles, of different thin-film batteries.

Bars 301, 302 and 303 respectively represent the capacity, after a first charging phase, of a thin-film battery of lithium-metal type, of a battery corresponding to the battery of FIG. 1 in which the layer 110 is omitted, and of the battery of FIG. 1, the batteries having similar dimensions. In this example, the first charging phase of the lithium-free batteries (bars 302 and 303) is a slow charging step under a constant current.

The bars 301 and 303 show that the initial capacity of the battery of FIG. 1 is substantially equal to that of a corresponding battery of lithium-metal type, that is to say approximately 1200 $\mu A \cdot h$ in this example. In addition, the bars 302 and 303 show that the initial capacity of the battery of FIG. 1 is greater than that of a corresponding battery not having the layer 110, the capacity of the latter being equal to approximately 1000 $\mu A \cdot h$ in this example.

Bars 305, 306 and 307 respectively represent the capacity, after 50 charge and discharge cycles, of batteries corresponding to the bars 301, 302 and 303.

The bars 305 and 307 show that, after 50 charge and discharge cycles, the capacity loss of the battery of FIG. 1 is substantially the same as that of a corresponding lithium-metal battery, this loss of capacity being substantially equal to 50 $\mu A \cdot h$ in this example. In addition, the bars 306 and 307 show that, after 50 charge and discharge cycles, the loss of capacity of the battery of FIG. 1 is lower than that of a corresponding battery not having the layer 110, the loss of capacity of the latter being approximately equal to 120 $\mu A \cdot h$ in this example.

Thus, after 50 charge and discharge cycles, the loss of capacity of the lithium-free battery of FIG. 1, which comprises the layer 110, is approximately 2.4 times lower than that of a corresponding battery without this layer 110. Stated otherwise, the lifetime of the lithium-free battery of FIG. 1, which comprises the layer 110, is about 2.4 times higher than that of a corresponding battery without this layer 110.

A thin-film battery of lithium-free type comprising a layer 110 thus has performance in terms of initial capacity and lifetime which are substantially the same as those of a corresponding battery of lithium-metal type, this performance being better than that of a corresponding battery of lithium-free type in which the layer 110 is omitted.

Particular embodiments have been described. Diverse variants and modifications will be apparent to those skilled in the art. In particular, the embodiments described are not limited to the particular example of a battery structure described with reference to FIG. 1. More generally, the embodiments described are compatible with any common structures of thin-film batteries of lithium-free type.

In addition, the embodiments described are not limited to the examples of dimensions, and in particular of thicknesses of the various layers, mentioned in the present application.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A battery, comprising:
a support;
a conductive layer on the support, the conductive layer having a first portion and a second portion separated from one another by an aperture;
an electrolyte layer on the conductive layer;
a copper electrode on the electrolyte layer, the copper electrode contacting the first portion of the conductive layer and contacting the support through the aperture, the electrolyte layer separating the copper electrode from the second portion of the conductive layer; and
an alloy-forming layer, of a material capable of forming an alloy with lithium, in contact with the copper electrode.

2. The battery according to claim 1, wherein the material is silicon, germanium, silicon-germanium, tin or aluminum.

3. The battery according to claim 1, further comprising a LiPON electrolyte layer interposed between the copper electrode and a further electrode.

4. The battery according to claim 3, wherein the further electrode is a $LiCoO_2$ layer.

5. The battery according to claim 3, wherein a first face of the copper electrode is in contact with the alloy-forming layer, and a second face of the copper electrode is facing the electrolyte layer.

6. The battery according to claim 3, wherein the copper electrode is in contact with the electrolyte layer.

7. The battery according to claim 3, wherein the electrolyte layer comprises an accumulation of metallic lithium close to an interface between the electrolyte layer and the copper electrode.

8. The battery according to claim 1, wherein the alloy-forming layer has a thickness between 10 and 50 nm.

9. The battery according to claim 1, wherein the copper electrode has a thickness between 50 nm and 1 μm.

10. The battery according to claim 1, wherein the battery is a thin-film battery.

11. A method, comprising:
manufacturing a battery, the manufacturing including:
forming a conductive layer on the support, the conductive layer having a first portion and a second portion separated from one another by an aperture;
forming an electrolyte layer on the conductive layer, the electrolyte layer contacting the second portion of the conductive layer;
forming a copper electrode on the electrolyte layer, the copper electrode contacting the first portion of the conductive layer and contacting the support through the aperture, the electrolyte layer separating the copper electrode from the second portion of the conductive layer; and
forming an alloy-forming layer, of a material capable of forming an alloy with lithium, directly on the copper electrode.

12. The method according to claim 11, comprising, before forming the copper electrode:
forming a further electrode; and
forming an electrolyte layer on the further electrode, wherein forming the copper electrode includes forming the copper electrode directly on the electrolyte layer.

13. The method of claim 11, further comprising:
putting the battery into service, the putting including a first charging phase of the battery under a current of at most a few tens of microamperes per square centimeter, for a plurality of hours.

14. A battery, comprising:
a support; a conductive layer on the support, the conductive layer having a first portion and a second portion separated from one another by an opening;
a positive electrode positioned on the first portion of the conductive layer;
electrolyte layer positioned on the positive electrode;
a negative electrode formed on the electrolyte layer, the negative electrode including copper and contacting the support though the opening, the electrolyte layer separating the positive electrode from the negative electrode; and
an alloy-forming layer, of a material capable of forming an alloy with lithium, in contact with the negative electrode.

15. The battery according to claim 14, wherein the material is silicon, germanium, silicon-germanium, tin or aluminum.

16. The battery according to claim 14, further comprising a first conductive layer positioned between the positive electrode and a substrate, a portion of the first conductive layer being a positive terminal of the battery.

17. The battery according to claim 16, wherein the second portion of the conductive layer is connected to the negative electrode, and is a negative terminal of the battery.

18. The battery according to claim 17, further comprising an encapsulation layer that encapsulates the positive electrode, electrolyte layer, negative electrode, and alloy-forming layer, while leaving exposed the positive and negative terminals.

19. The battery according to claim 17, wherein:
the negative electrode extends into the opening and contacts the second portion of the conductive layer; and
the electrolyte layer extends into the opening and contacts the first portion of the conductive layer.

20. The battery according to claim 17, further comprising:
a first adhesion layer positioned between the first portion of the conductive layer and the substrate; and a second adhesion layer positioned between the second portion of the conductive layer and the substrate.

\* \* \* \* \*

UNITED STATES PATENT AND TRADEMARK OFFICE
CERTIFICATE OF CORRECTION

PATENT NO. : 11,038,209 B2
APPLICATION NO. : 16/268210
DATED : June 15, 2021
INVENTOR(S) : Franck Ferreira Gomes et al.

It is certified that error appears in the above-identified patent and that said Letters Patent is hereby corrected as shown below:

In the Claims

Column 8, Claim 16, Lines 47-50:
"The battery according to claim 14, further comprising a first conductive layer positioned between the positive electrode and a substrate, a portion of the first conductive layer being a positive terminal of the battery."

Should read:
--The battery according to claim 14, wherein the first portion of the conductive layer is a positive terminal of the battery.--

Signed and Sealed this
Twenty-eighth Day of June, 2022

Katherine Kelly Vidal
*Director of the United States Patent and Trademark Office*